June 30, 1936.  F. A. DURAND  2,045,573

SIZING AND GRADING MACHINE

Filed Aug. 16, 1934  2 Sheets—Sheet 1

Fred A. Durand
INVENTOR

BY Wilson Corder
ATTORNEY

June 30, 1936.  F. A. DURAND  2,045,573
SIZING AND GRADING MACHINE
Filed Aug. 16, 1934  2 Sheets-Sheet 2
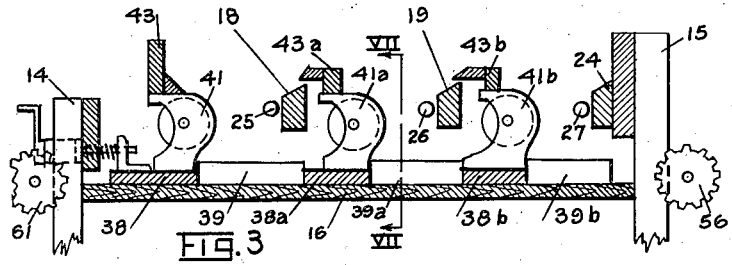
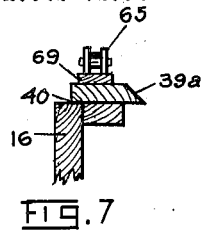
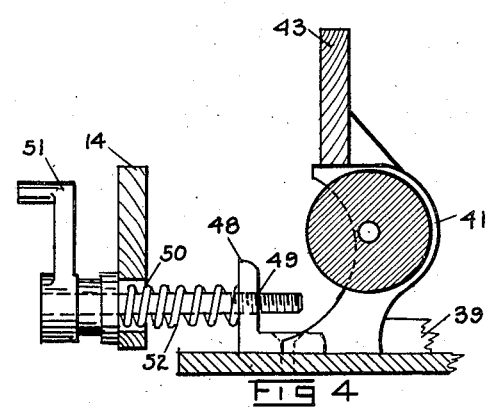
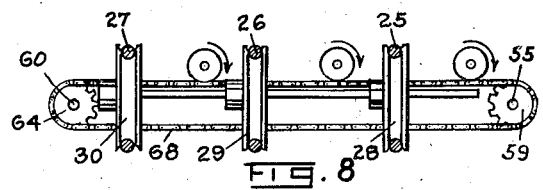
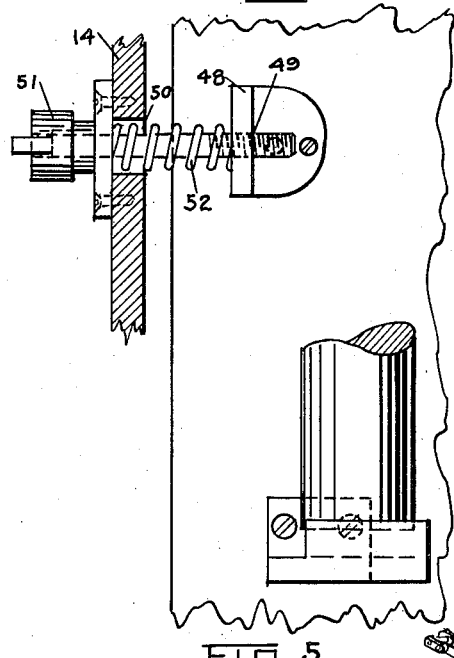
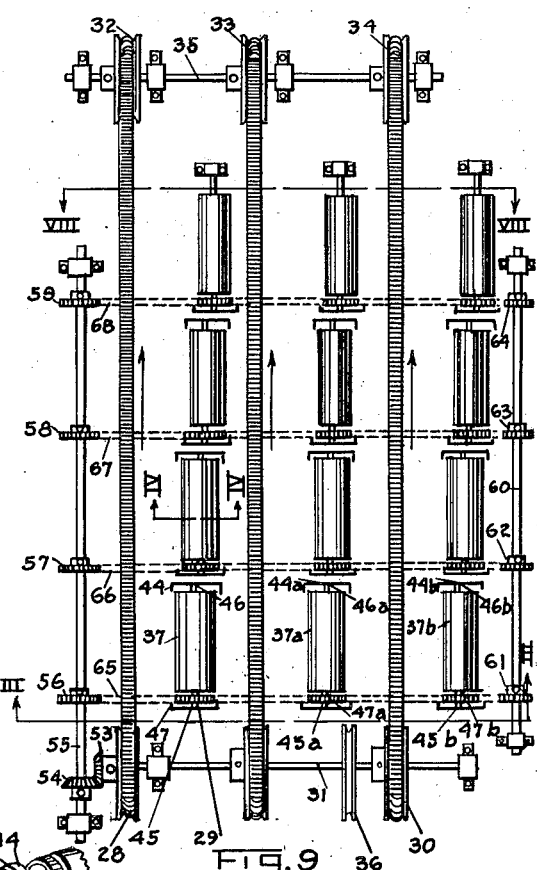
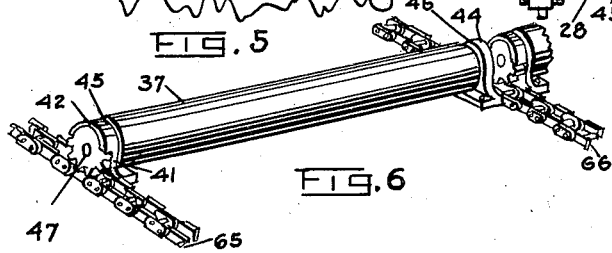
Fred A. Durand
INVENTOR
BY *[signature]*
ATTORNEY Patented June 30, 1936

2,045,573

UNITED STATES PATENT OFFICE 2,045,573

SIZING AND GRADING MACHINE

Fred A. Durand, Woodbury, Ga.

Application August 16, 1934, Serial No. 740,137

9 Claims. (Cl. 209—103)

This invention relates to apparatus for sizing and grading fruits, vegetables, and the like; and more particularly, to means whereby the rollers of such a device may be independently, simply, and positively adjusted.

The invention also contemplates novel driving means for said rollers, and for the fruit impellers which operate in conjunction therewith, which means by virtue of their simplicity and ready adaptability to the varying requirements of this machine, represent a distinct advance in the art.

Heretofore, fruit sizers have been proposed, the general structure of which consists of a guideway or channel for the fruit to pass along, rollers disposed to one side of the channel, which rollers are rotated during operation of the device for the purpose of turning the article being processed, and impelling or conveying means disposed longitudinally of the rollers to carry the fruit through the machine. The purpose of such devices is to size or grade the fruit according to the requirements of a given industry, preparatory to packing and shipping. For example, in the case of peaches, the very small fruit cannot be shipped, and hence must be separated initially from the bulk of the picked crop. Once this is done, a second size or moderately small fruit is divided out to be packed, as is a third or somewhat larger grade, and so on until the very large fruit that has not been thus separated passes over the end of the machine to be collected and packed.

It is apparent that the size of the space between the roller and the guide will determine the size of fruit that will pass there-between and hence be separated by that particular section of roller. Hence it is necessary to adjust said rollers to meet the requirements of the article being graded; and to effect this purpose, many intricate mechanisms have been employed, most of which, besides being complex, are unsatisfactory in that by varying the adjustment of the roller, the driving means for such is thrown out of balance, which results either in unsatisfactory operation of the machine, or necessitates tightening of belts, shortening of chains, or other operations which are both wasteful of time and generally unsatisfactory.

Also to be noted is the fact that in machines now in use the sizer rolls are progressively tapered or made of smaller diameter towards the front or discharge end of the device, which makes for a lack of flexibility in adjustment, since any variation in adjustment of the roller proper correspondingly widens or narrows the space opposite each segment thereof. That is, the entire roller operates as a unit, and hence no independence of adjustment is possible.

An object of this invention is to provide a sizing machine in which the rollers are separately and independently adjustable.

Another object is to provide a simple and positive means for driving the rollers of a sizer.

Another object is to provide driving means that are not affected by changes in spacing of the rollers.

Another object is to provide simplicity of structure, ready adjustability, and a minimum of working parts in a device of the foregoing type.

Summarized, the objects of this invention are to provide an improved fruit sizer and grader, which device is simple in structure, efficient in operation, and highly desirable for the purposes intended.

In order that my invention may be fully understood, reference is directed to the drawings herein, in which:

Fig. 3 is a view partially in vertical cross-section and taken along the line III—III of Fig. 9, illustrating the method of adjustment of the rollers of the instant device.

Fig. 4 is an enlarged view of the roller adjusting mechanism, said view being partially in cross-section, and taken along the line IV—IV of Fig. 9.

Fig. 5 is a top plan view partly in section of the structure illustrated in Fig. 4.

Fig. 6 is a view in perspective of one of the sizing rollers of my device, showing part of the driving mechanism therefor.

Fig. 7 is an enlarged fragmental view in vertical cross-section, taken along the line VII—VII of Fig. 3, illustrating the supporting means for the sprocket chains herein.

Fig. 8 is a cross-section view taken along the line VIII—VIII of Fig. 9, illustrating the driving mechanism for the rollers.

Fig. 9 is a plan view of the rollers and driving mechanism, showing in detail the arrangement thereof, the rollers being drawn somewhat shorter than in an actual machine, and certain supporting elements being omitted for the sake of clearness.

Like numerals indicate corresponding parts throughout the various figures of the drawings, and sectional or semi-sectional views are taken looking in the direction of the arrows indicated on the drawings.

Figure 1:
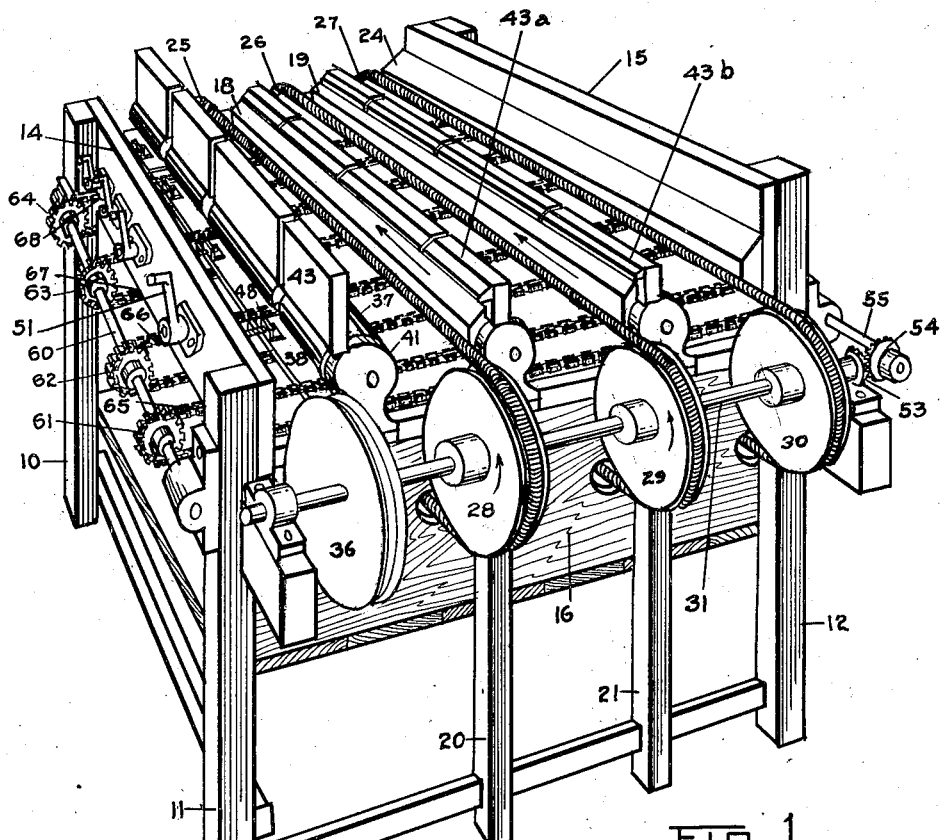
Fig. 1 is a view in perspective of a fruit sizer embodying essential elements of my device.
Figure 2:
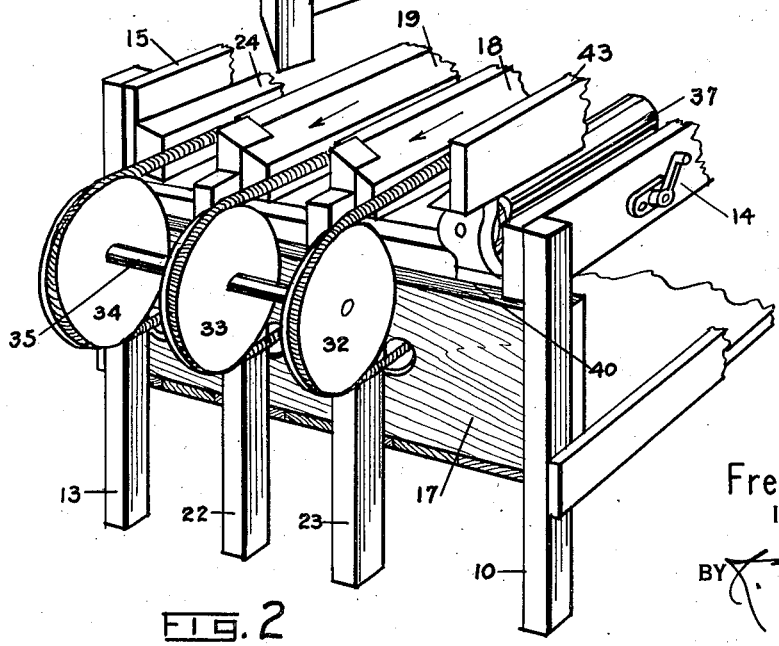
Fig. 2 is a view of the discharge end of the machine illustrated in Fig. 1, the view being fragmentary in part.

Referring now to the drawings, (Figs. 1 and 2), my device comprises a supporting frame-work consisting of legs 10, 11, 12, and 13, side rails 14 and 15, and cross supports 16 and 17, the latter forming a bed upon which slideably operates a series of rollers and their related parts, which structure is described more in detail elsewhere herein.

Extending longitudinally and parallel to rails 14 and 15 is a pair of beveled guides 18 and 19, which guides are attached to and held in fixed position by legs 20, 21, 22, and 23. A third beveled guide 24 is united with side rail 15, elements 18, 19 and 24 providing, in combination with other members, a channel free from sharp edges, along which fruit may pass without injury (Fig. 3). Parallel to said guides operates a series of endless spring belts or impellers 25, 26, and 27, which belts are carried by pulleys 28, 29, and 30 which are fixedly mounted on a shaft 31 at one end of the machine; and pulleys 32, 33, and 34 which are positioned on an idler shaft 35 at the opposite end of the device. Impellers 25, 26, and 27 may be fabricated of rope, spring steel, rubber, or other suitable material or composition, recent experiments having demonstrated that rubber is very satisfactory for this purpose because it does not mark the fruit as in the case of spring belts now commonly in use, and in addition is free from the noise caused by the revolving of such belts. Mounted on shaft 31 is a driving pulley 36, which may be suitably connected to a source of power (not shown) when the machine is in operation.

Attention is now directed to the sizing rollers, and the method of adjustment and driving thereof. Since each series of rollers herein is identical with any other series, and since as many series may be employed as is necessary to effect the purposes of a given machine in a given industry, only one set is described in detail, it being understood that the units of my device may be multiplied or reduced as deemed necessary or desirable.

The sizing rollers herein, which are indicated as 37, 37a, and 37b, are mounted in transverse series capable of adjustment; may be indirectly supported by longitudinal strips such as 38, 38a, and 38b (Fig. 3); and said strips may be joined at their ends by transverse strips 39, 39a, and 39b. The resulting frame-work may be channeled or grooved with end support 16 and similar intermediate supports as at 40 (Fig. 7), so as to slide in strict parallel relation thereto, and at right angles to the longitudinal guides herein (Fig. 2); or other means may be employed to secure the foregoing result, as for instance, by sliding the carriage on rods provided for such purpose and previously aligned in the proper manner. Likewise, it is apparent that the carriage structure herein may be made in a single piece, as, for instance, a casting, the object being to provide a structure to carry the sizing rollers adjustably in the manner and according to the principle taught by the instant invention.

Spacedly mounted on supports 38, 38a, and 38b, is a series of roller supports 41, 41a, and 41b, which supports may also constitute guards for the sprocket gears at the ends of the rollers (Fig. 6), by being carried over at their tops as at 42, a distance sufficient to cover said gears and provide a smooth surface for the fruit to pass along during its progress through the machine.

A series of supplemental guards 43, 43a, and 43b (Fig. 3), may be carried by the roller supports for the purpose of completing the channel along which the fruit passes during said sizing and grading process.

Roller supports 41, 41a, and 41b and corresponding supports 44, 44a, and 44b (Fig. 9), provide bearings for rollers 37, 37a, and 37b, as at 45, 45a, 45b, and 46, 46a, and 46b, at their respective ends, said rollers being journaled therein; and a sprocket gear 47, 47a, and 47b is mounted at one end of each roller. The rollers are mounted at right angles to the end supports and exactly parallel to guides 18, 19, and 24, and to impellers 25, 26, and 27.

Special attention is now directed to the manner in which each series of rollers is transversely adjustable. An anchoring bracket or member 48 (Fig. 4) is provided at one side of each transverse series of rollers, being mounted on support 38 as shown in the drawings (Fig. 1), said member being located at a point preferably about midway between the ends of an associated roller; and is pierced by a threaded opening 49. At a point exactly opposite said opening, side piece 14 is pierced by a hole 50, and a crank 51 is snugly mounted therein, the end portion of said crank being threaded to engage the threads of hole 49 in 48; and a spring 52 is passed around the portion of the crank between 14 and 48 so as to provide tension between these two surfaces. It is thus apparent that by turning crank 51 either to the right or to the left the space between the rollers and the fixed guides may be increased or decreased, according to the will of the operator.

Fixedly mounted on the end of shaft 31 is a bevel gear 53 engaging a similar gear 54 mounted on a shaft 55. At stated intervals along shaft 55 are mounted sprocket gears 56, 57, 58, and 59, while an idler shaft 60 mounted on the opposite side of the machine carries a similar series of sprocket gears 61, 62, 63, and 64, said gears being in transverse alignment with the sprocket gears mounted on the ends of the sizing rollers. Sprocket chains 65, 66, 67, and 68 connect the gears in such a manner that when power is applied to pulley 36 revolving shaft 31 and hence gear 53 and gear 54, thereby turning shaft 55 and the sprocket gears mounted thereon, such revolution likewise drives the sprocket chains which are associated with the sprocket gears mounted on the rollers, so as to rotate such at a uniform rate of speed and without interference with the passage of fruit above.

Beneath the sprocket gear of each roller may be placed a chain support and guide 69 (Fig. 7), mounted upon the carriage supporting structure in such a manner as to keep the chain and associated gear in positive operative engagement.

The operation of the sizer is obvious, fruit entering one end thereof being turned by the rollers, such turning avoiding any possibility of injuring the fruit by friction, since the point of contact of the fruit with the machine is constantly changing; and revolving the fruit about its minimum diameter so as to permit it to drop through the space between the rollers and guide, or by means of the impellers, to pass on to the next wider space afforded by the next series of rollers, to be likewise treated until it is either passed into one of the intermediate size grades or carried over the end of the machine to be packed as the largest sized product of a particular plant.

Suitable means for conveying the fruit dropping into the various grades may be provided, such as belts or chutes which carry the articles thus sized to packers or otherwise dispose of it as desired, no such structure being illustrated herein however since such does not constitute part of the instant invention.

It is to be noted that by simply turning crank 51 in the manner previously described herein, the space between a given series of rollers and their guides can be almost instantly varied by means of my invention. That the structure described and illustrated herein keeps the rollers in exact parallel relation to said guides, which insures uniform and positive grading; in contrast to other devices in which dual adjusting means for the rollers sooner or later makes for mis-alignment thereof with attendant bad results. It is also to be noted that the rollers of the instant device revolve at a uniform rate of speed throughout the machine, which precludes bruising or tearing the surface of the fruit, as may happen in sizers employing rollers of a tapered or graduated structure, it being apparent that since such rollers are driven as a single unit and at a high rate of speed, the peripheral speed of the sections having larger diameters is considerably greater than that of smaller sections, the sudden transfer of fruit from one section where it is revolving at a different rate of speed produces a skidding action on the side of the fruit such as to bruise it, and either renders considerable portions of it immediately unfit for use, or produces a condition in the fruit which causes rotting and decay thereof during shipping, with attendant economic loss.

It is also to be noted that the rollers of my device may be adjusted without interfering in any manner with the drive of the machine. That is, as the rollers are shifted to the right or to the left, the sprocket gears on the ends thereof simply travel along the sprocket chains, and neither decrease nor increase the tension of said chains, thus eliminating an unsatisfactory condition heretofore existing in machines of this type in which a change in the roller adjustment necessitated a change in the entire driving apparatus. The instant machine, on the contrary, when once adjusted, remains so indefinitely; the saving in time and the greater convenience of such a device being obvious.

Likewise apparent is the fact that my device in its simplicity eliminates numerous working parts in fruit sizing and grading machines, and represents a compact, efficient, and economical device of this type, performing all the functions ascribed to it in a superior and highly satisfactory manner.

While I have described one form of my invention in considerable detail herein, it is understood that I do not intend to thereby limit myself, but recognize that various changes, alterations, and re-arrangements may be made without departing from the scope of the instant invention as defined by the claims appended hereto.

I claim:

1. A machine of the class described, comprising a frame having a series of fixed guides longitudinally disposed thereon, a plurality of impeller belts, a plurality of sizing rolls disposed in end-to-end relation longitudinally of said belts and in transverse series and spaced from said belts to provide a series of graduated sizing outlets, all of said rolls being disposed at the same side of said belts, a single supporting carriage for each transverse series of rolls, means whereby each of said carriages is independently transversely adjustable upon said frame, thereby moving said rolls as a unit in the same direction, said means consisting of a bracket anchored upon said carriage intermediate the ends thereof, a threaded opening in said bracket, a threaded crank disposed within said frame and engaging the opening in said bracket, and means for driving said rolls and said belts.

2. A machine of the class described, comprising a frame having a series of fixed guides longitudinally-disposed thereon, a plurality of impeller belts, a plurality of sizing rolls disposed in end-to-end relation longitudinally of said belts in transverse series, and spaced from said belts to provide a series of graduated sizing outlets, all of said rolls being disposed at the same side of said belts, a supporting carriage for each transverse series of said rolls, means whereby each of said carriages is independently transversely adjustable upon said frame, thereby moving said rolls as a unit in the same direction, and means for driving said rolls and said belts.

3. A machine of the class described comprising a frame having a series of fixed guides longitudinally-disposed thereon, a plurality of impeller belts, a plurality of sizing rolls disposed in end-to-end relation longitudinally of said belts and in transverse series, and spaced therefrom to provide a series of graduated sizing outlets, all of said rolls being disposed at the same side of said belts, a supporting carriage for each transverse series of rolls, and means whereby each of said carriages is independently transversely adjustable upon said frame, thereby moving said rolls as a unit in the same direction, said means consisting of a crank having a threaded end, disposed on one side of said frame and passed therethrough to engage a support mounted upon said carriage, said support having an opening therein with threads complementary to those of said crank, and means for driving said rolls and said belts.

4. A machine of the class described comprising a frame having a series of fixed guides longitudinally-disposed thereon, a plurality of spring impelling belts, a plurality of sizing rolls disposed in end-to-end relation longitudinally of said belts and in transverse series, and spaced therefrom to provide a series of graduated sizing outlets, all of said rolls being disposed at the same side of said belts, a supporting carriage for each transverse series of rolls, and means whereby each of said carriages is independently transversely adjustable upon said frame, thereby moving said rolls as a unit in the same direction, said means consisting of a crank fixedly mounted within said frame and engaging said carriage in such a manner as to move said carriage to the left or to the right upon the crank's being revolved.

5. A machine of the class described comprising a frame having a series of fixed guides longitudinally-disposed thereon, a plurality of impelling belts, a plurality of sizing rolls disposed in end-to-end relation longitudinally of said belts and in transverse series, and spaced therefrom to provide a series of graduated sizing outlets, all of said rolls being disposed at the same side of said belts, a supporting carriage for each transverse series of rolls, said carriage comprising a frame-work carrying a series of upright members into which the ends of said rolls are journaled; means whereby each of said carriages is independently transversely adjustable upon said frame, said means providing for the simultaneous movement of all rolls of a given series as a unit in one direction, either towards or away from said impelling belts; and means for driving said rolls and said belts.

6. A machine of the class described, comprising a frame having a series of fixed guides longitudinally disposed thereon, a plurality of impelling belts, a plurality of sizing rolls disposed in end-to-end relation longitudinally of said belts and in transverse series, and spaced from said belts to provide a series of graduated sizing outlets, a supporting carriage for each transverse series of rolls, said carriage comprising a frame-work carrying a series of upright members into which the ends of said rolls are journaled, sprocket gears upon one end of each roll, means whereby each of said carriages is independently transversely adjustable upon said frame, and means for driving said rolls and said belts.

7. A machine of the class described, comprising a frame having a series of fixed guides longitudinally disposed thereon, a plurality of impelling belts, a plurality of sizing rolls disposed in end-to-end relation longitudinally of said belts and in transverse series, and spaced from said belts to provide a series of graduated sizing outlets, a supporting carriage for each transverse series of rolls, said carriage comprising a frame-work carrying a series of upright members into which the ends of said rolls are journaled, sprocket gears upon one end of each roll, a driving chain in engagement with said gears, means whereby each of said carriages is independently transversely adjustable upon said frame, and means for driving said shaft and said belts.

8. A machine of the class described, comprising a frame having a series of fixed guides longitudinally disposed thereon, a plurality of impelling belts, a plurality of sizing rolls disposed in end-to-end relation longitudinally of said belts and in transverse series, and spaced from said belts to provide a series of graduated outlets, a supporting carriage for each transverse series of rolls, said carriage comprising a frame-work carrying a series of upright members into which the ends of said rolls are journaled, longitudinal guards mounted upon said upright members, a sprocket gear upon one end of each roll, a driving chain in engagement with said gears, means whereby each of said carriages is independently transversely adjustable upon said frame, and means for driving said chain and said belts.

9. A machine of the class described, comprising a frame having a series of fixed guides longitudinally disposed thereon, a plurality of impelling belts, a plurality of sizing rolls disposed in end-to-end relation longitudinally of said belts and in transverse series, and spaced from said belts to provide a series of graduated outlets, a supporting carriage for each transverse series of rolls, said carriage comprising a frame-work carrying a series of upright members into which the ends of said rolls are journaled, longitudinal vertical guards mounted upon said upright members, sprocket gears upon one end of each roll, a driving chain in engagement with said gears, a shaft and an idler shaft mounted in parallel relationship to said rolls, sprocket gears mounted upon said shafts in transverse alignment with said first mentioned sprocket gears and in engagement with said chain, means whereby each of said carriages is independently transversely adjustable upon said frame, and means for driving said shaft and said belts.

FRED A. DURAND.